United States Patent [19]
Eberle et al.

[11] Patent Number: 5,969,294
[45] Date of Patent: Oct. 19, 1999

[54] FIBER OPTIC CONNECTOR CABINET WITH ROTATABLY MOUNTED ADAPTER PANELS

[75] Inventors: Steiner A. Eberle, Hickory, N.C.; Jennifer Noble, Fort Worth; Andrew Stanush, Haltom City, both of Tex.; Joseph K. Dodd, Lee's Summit, Mo.

[73] Assignee: Siecor Operations, LLC, Hickory, N.C.

[21] Appl. No.: 09/001,847

[22] Filed: Dec. 31, 1997

[51] Int. Cl.⁶ .................................................. H01H 9/02
[52] U.S. Cl. .............................................. 174/57; 361/645
[58] Field of Search ..................... 174/57, 50; 361/645

[56] References Cited

U.S. PATENT DOCUMENTS

| | | | |
|---|---|---|---|
| 4,824,196 | 4/1989 | Bylander | 350/96.2 |
| 4,995,688 | 2/1991 | Anton et al. | 350/96.1 |
| 5,127,082 | 6/1992 | Below et al. | 206/557 X |

*Primary Examiner*—Dean A. Reichard

[57] ABSTRACT

A fiber optic connector cabinet is provided that has at least one adapter panel rotatably mounted to the cabinet and that carries at least one fiber optic connector adapter. The angular position of the adapters relative to a front plane of the cabinet is readily adjustable.

11 Claims, 12 Drawing Sheets

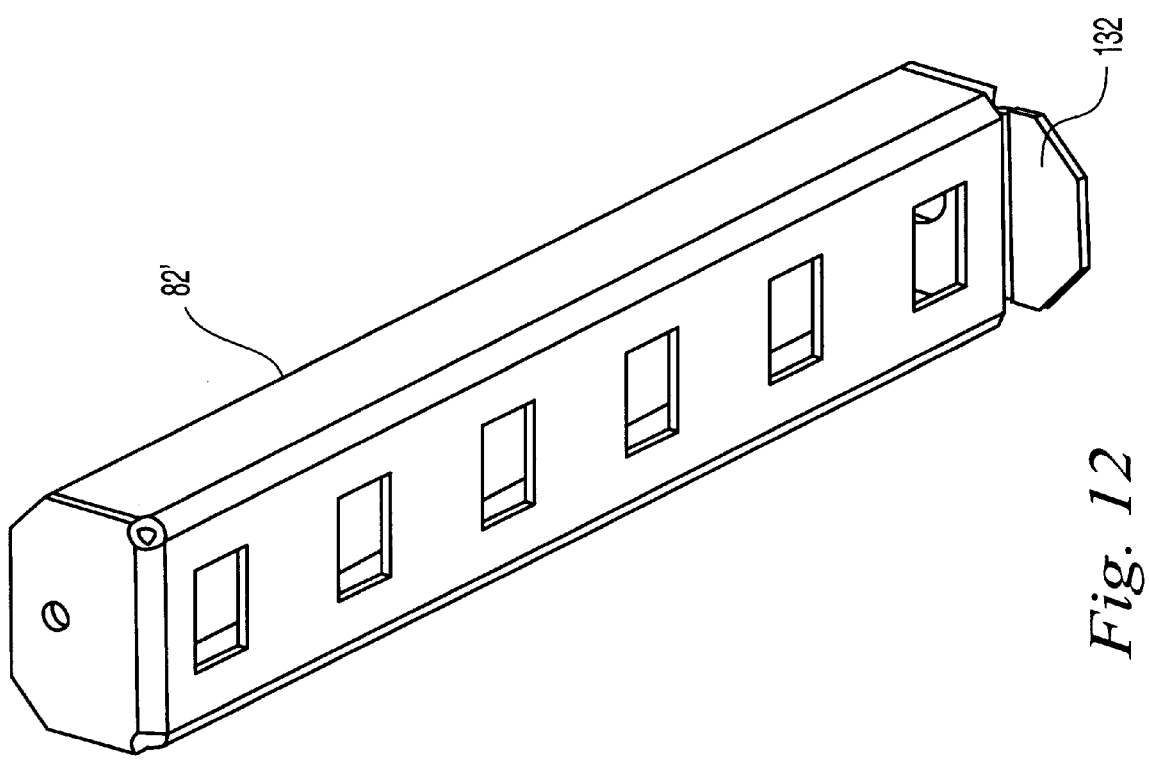

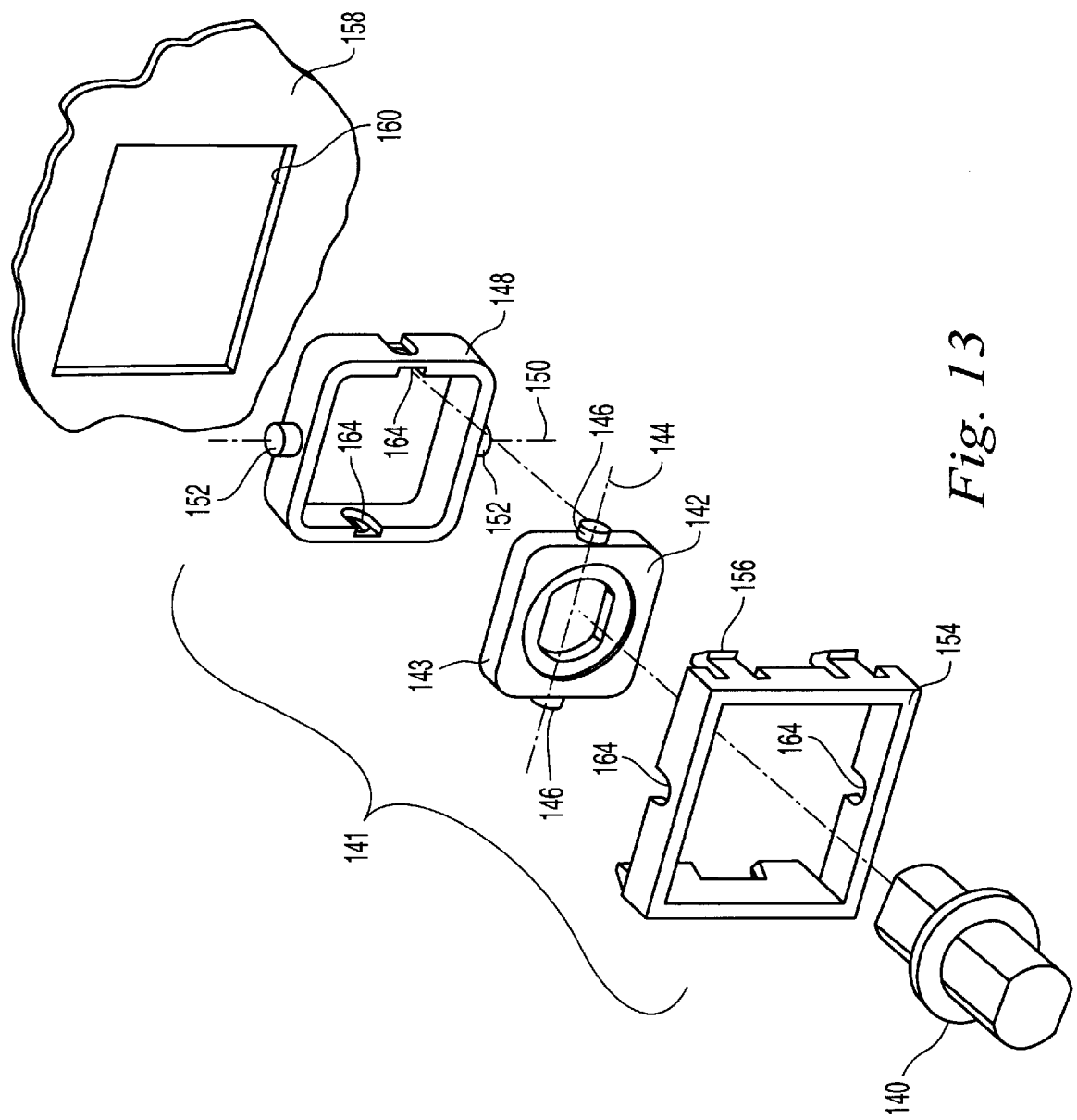

ously mounted to the cabinet.

FIBER OPTIC CONNECTOR CABINET WITH ROTATABLY MOUNTED ADAPTER PANELS

TECHNICAL FIELD OF THE INVENTION

The present invention relates to fiber optic connector cabinets. In one aspect, the present invention relates to a fiber optic connector cabinet on which adapter panels are rotatably mounted to allow for angular adjustment of the adapters relative to the cabinet.

BACKGROUND OF THE INVENTION

Fiber distribution frames are used in the fiber optic industry to provide a point of interconnection between an array of incoming optical fiber cables and an array of outgoing optical fibers. Optimally, the fiber distribution frame allows reconfiguration of the incoming fibers relative to the outgoing fibers to provide flexibility in the optical fiber network. To achieve such flexibility, fiber distribution frames typically are designed to receive different types of cabinets on the frame that can be arranged depending on the requirements of the specific network being constructed. Such cabinets can include splice cabinets where fibers are joined by a splicing technique and the splices are organized and stored in trays in the splice cabinet. Another cabinet is storage cabinets that organize and store excess cable slack so as to prevent bending of the fiber cable beyond its minimum bend radius.

Another commonly used cabinet is the coupler cabinet that has an array of couplers for coupling a pair of optical fiber connectors that are terminated on the ends of a respective pair of optical fibers. One side of the array of couplers typically receives connector-terminated incoming fiber cables and the other side of the array of couplers will receive connector-terminated jumper cables or outgoing fiber cables, or vice versa.

It is preferred that the array of couplers in the cabinet provide for the following features: (1) ease of installation of connectors on both sides of couplers, (2) insurance against exceeding minimum bend radius of optical fiber cables, (3) accommodating a variety of reconfigurations of the connectors on the array of couplers, and (4) minimizing space required at the front of the coupler cabinet for the optical fiber extending from the front of the array of couplers.

In existing coupler cabinets for fiber distribution frames the couplers are typically mounted in the cabinet and fixed relative to the cabinet. For example, the couplers may be arrayed in a plane parallel to the front face of the cabinet with each coupler oriented perpendicular to the plane of the array. In such an arrangement, the optical fiber extending from the front of the array must be routed through a 90 degree turn to the coupler. In another example, the coupler cabinet shown in FIG. 9 of U.S. Pat. No. Re 34,955 has a front panel with the left half of the panel having an array of adapters that hold couplers at a 45 degree angle to the left, and the right half of the panel having an array of adapters that hold couplers at a 45 degree angle to the right. In such an arrangement, an optical fiber coming from the right side of the frame cannot be routed to a coupler in an adapter in the left half of the panel without the optical fiber having to be routed through a sharp turn. Such arrangement is limited on its accommodation of reconfigurations of connectors on the array of couplers.

Therefore a need exists for a coupler cabinet that allows the angle of the couplers relative to the array of couplers to be readily adjusted facilitate installation and reconfiguration of connectors to the array of couplers without exceeding the minimum bend radius of the optical fiber.

SUMMARY OF THE INVENTION

In one aspect, the present invention provides an optical fiber connector cabinet that comprises a housing defining a front plane that is generally vertical and at least one adapter panel rotatably mounted on the housing. The adapter panel is rotatable relative to the housing about an axis of rotation that is generally parallel with the front plane of the housing. At least one optical fiber connector adapter is mounted to the at least one adapter panel such that the angular position of the at least one adapter relative to the front plane of the cabinet can be varied by rotation of the adapter panel.

The present invention allows the angular position of the adapters to be adjusted for optimal routing of jumpers to the adapters.

BRIEF DESCRIPTION OF THE DRAWINGS

FIG. 12 is an alternative embodiment of an adapter panel for use in the front wall of FIG. 8;

FIG. 13 is an exploded view of the gimbal assembly for use in an alternative embodiment of a connector cabinet of the present invention.

DETAILED DESCRIPTION

Figure 1:
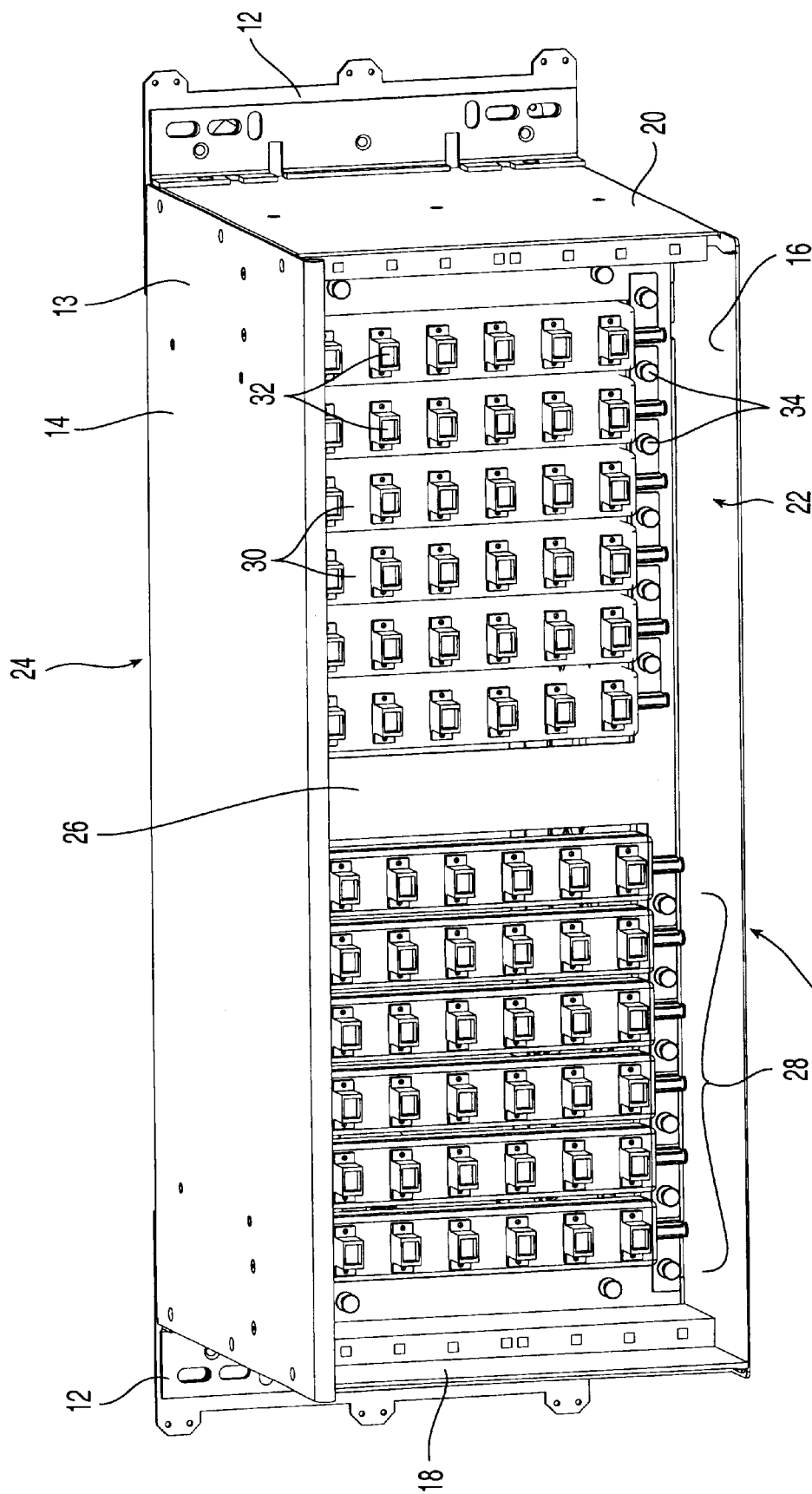
FIG. 1 is a perspective view of one embodiment of the connector cabinet of the present invention with the adapters oriented at 90 degrees to the front of the cabinet.

With reference to FIGS. 1–7 one embodiment of a connector cabinet 10 of the present invention is shown. Cabinet 10 has mounting flanges 12 for mounting to a frame as is well known and has housing 13 which is generally box shaped with top wall 14, bottom wall 16, first side wall 18, and second side wall 20 all defining front opening 22 and rear opening 24 opposite thereto. Cabinet 10 defines a front plane generally perpendicular to the plane of top wall 14 and bottom wall 16.

Housing 13 also has front wall 26 mounted in front opening 22 which has a plurality of mounting locations 28 to receive a plurality of adapter panels 30 which carry a plurality of adapters 32. Adapter panels 30 are pivotally mounted to pieces 33 which are attached to front wall 26 by fastener 34, for example a plunger type fastener. Other types of fasteners can be used in attaching pieces 33 to front wall 26.

Figure 4:
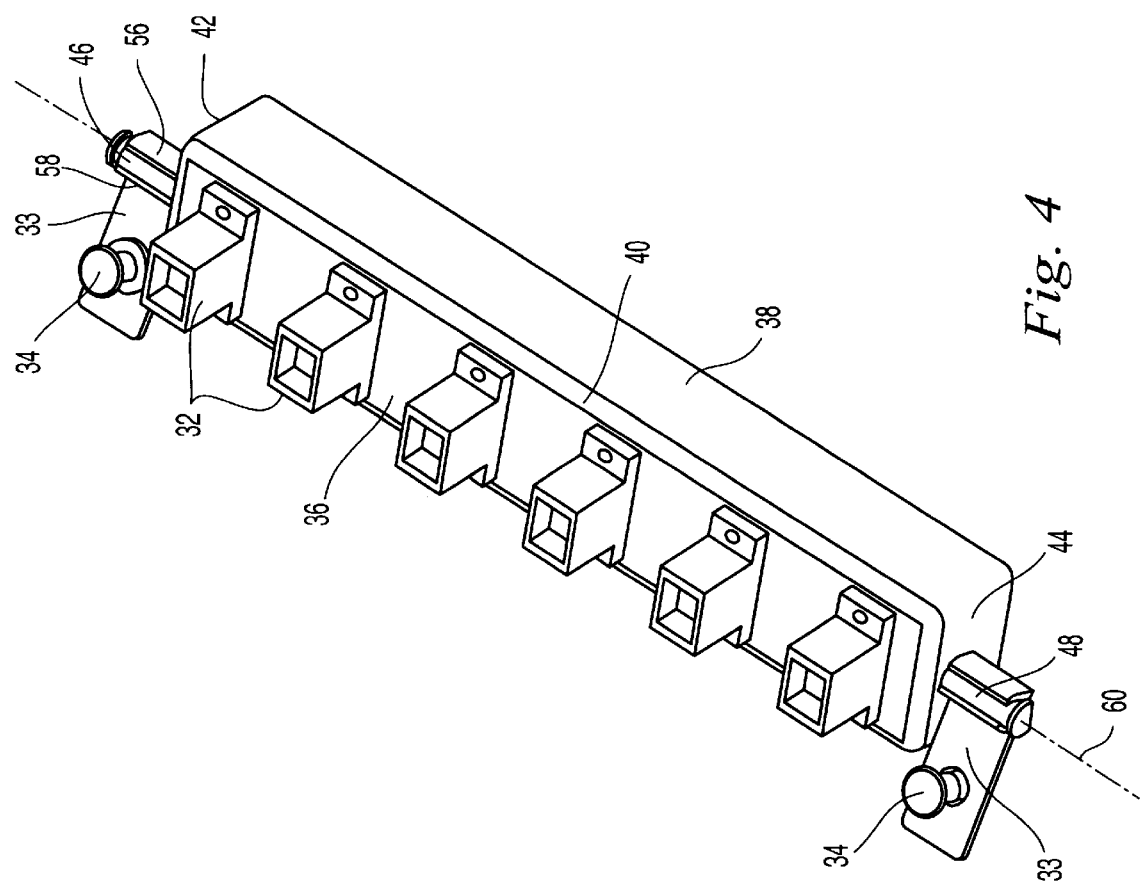
FIG. 4 is a perspective view of the adapter panel used in the cabinet of FIG. 1.
Figure 5:
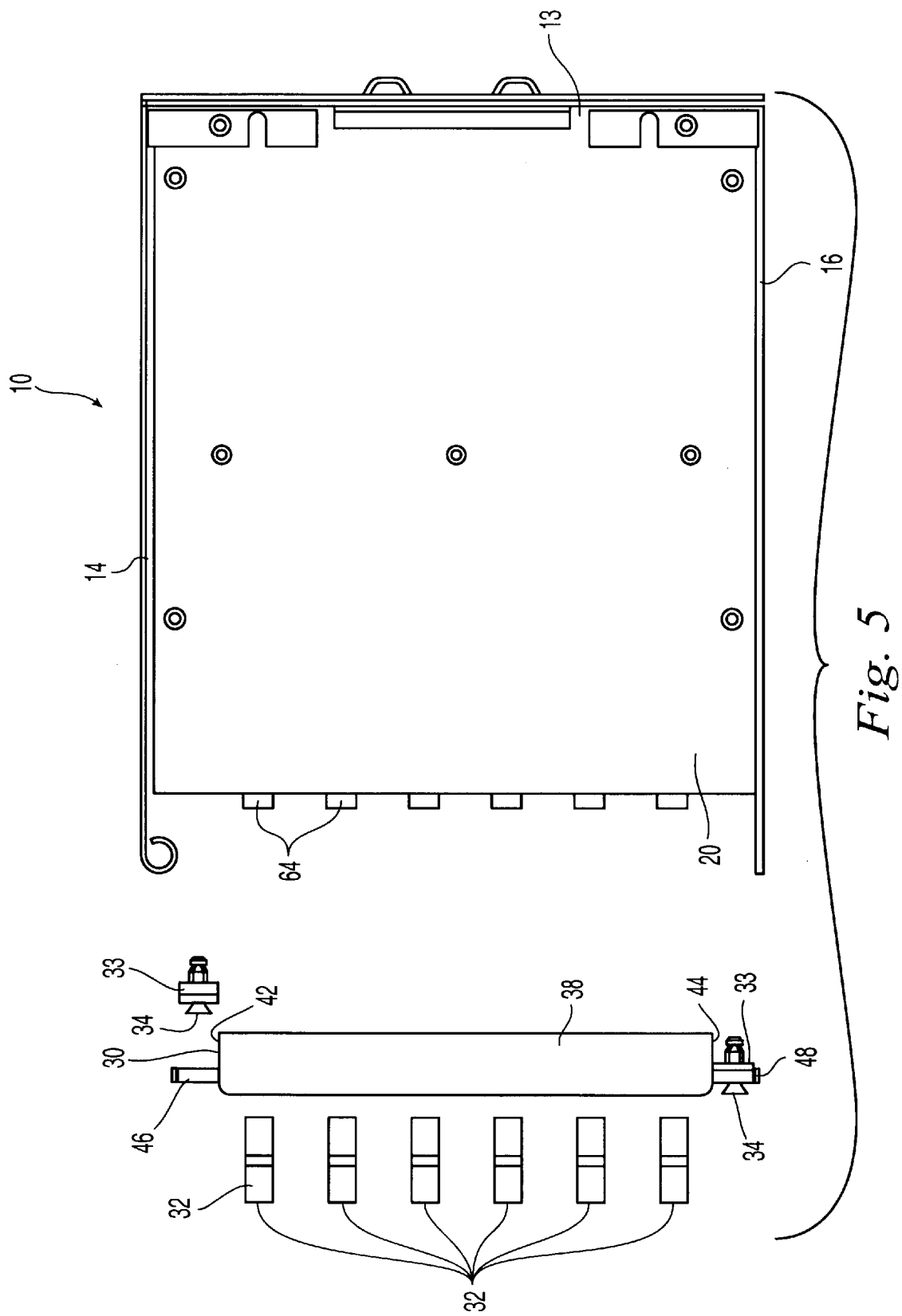
FIG. 5 is a side exploded view of an adapter panel of FIG. 4 and cabinet of FIG. 1.
Figure 6:
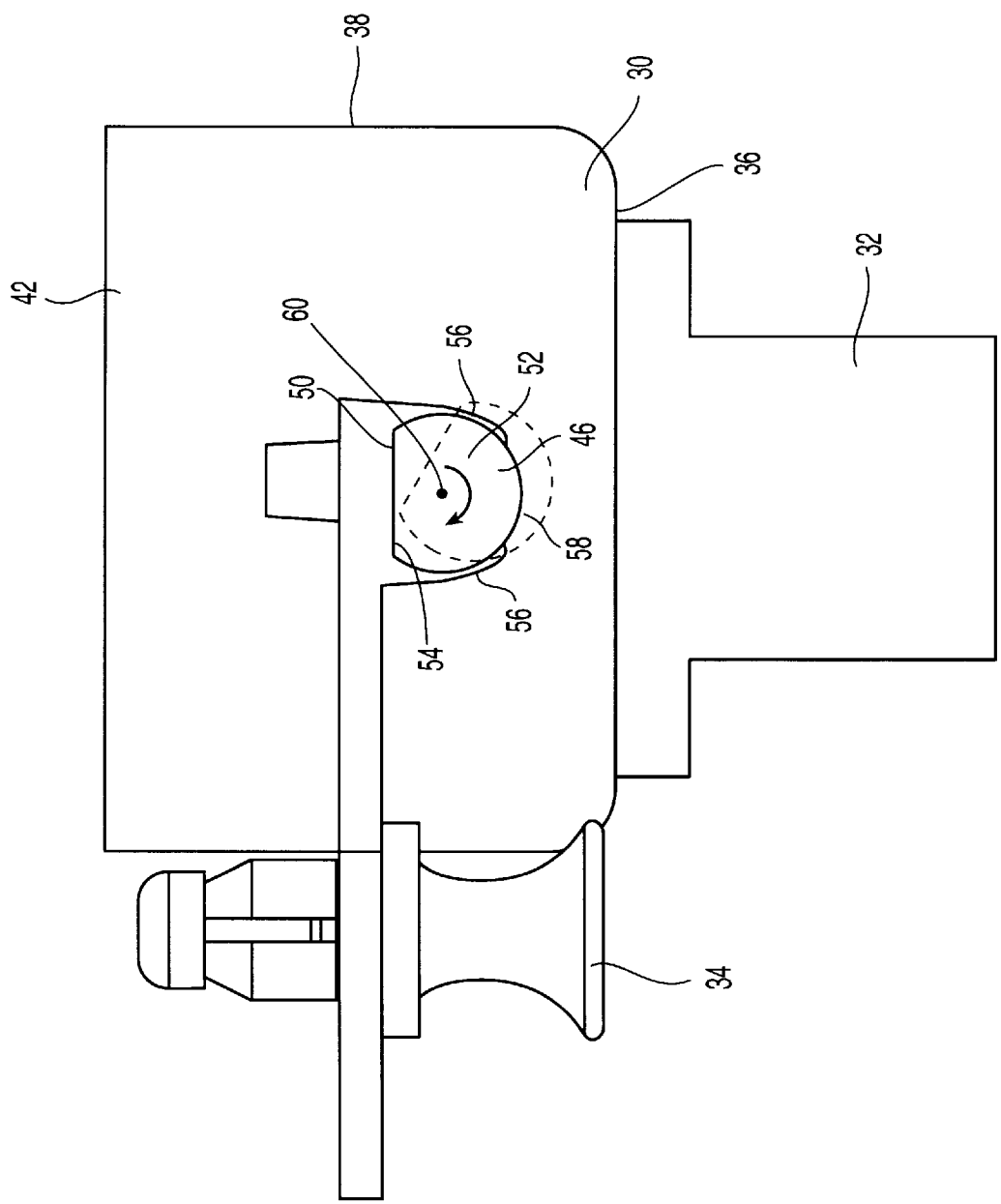
FIG. 6 is a top view of the adapter panel of FIG. 4.

With reference to FIGS. 4 and 6, adapter panel 30 has front wall 36 that carries adapters 32 and side walls 38 extending back from side 40 of front wall 36. Adapter panel 30 also has top wall 42 and bottom wall 44 from which extend top pivot stud 46 and bottom pivot stud 48, respectively. Pivot studs 46, 48 have a partial circular cross-section defining first flat 50. Piece 33 defines channel 52 with a cross-section generally corresponding to that of pivot studs 46, 48 and having second flat 54. Channel 52 is defined by flexible arms 56 of piece 33 which also define opening 58 through which pivot stud 46 can be snapped. Flats 50, 54 are oriented such that when first flat 50 of stud 46 is disposed opposite second flat 54, adapters 32 are oriented at 90 degrees with respect to the front plane of the cabinet.

First and second flats 50, 54 create a detent that holds adapter panels 30 in a detent position where adapters 32 are oriented at 90 degrees to the front plane of the cabinet. Arms 56 are sufficiently flexible to allow adapter panel 30 to be rotated by hand about axis 60 extending through top pivot stud 46 and bottom pivot stud 48 and out of its detent position, as shown by dashed lines in FIG. 6, such that adapters 32 are at an angle with respect to the front plane of the cabinet. Preferably, the friction between channels 52 and pivot studs 46, 48 is such to hold the adapter panel 30 at any angle to which the adapter panel 30 is rotated by hand; however, the friction could be such that adapter panel 30 freely rotates once out of its detent position.

Figure 2:
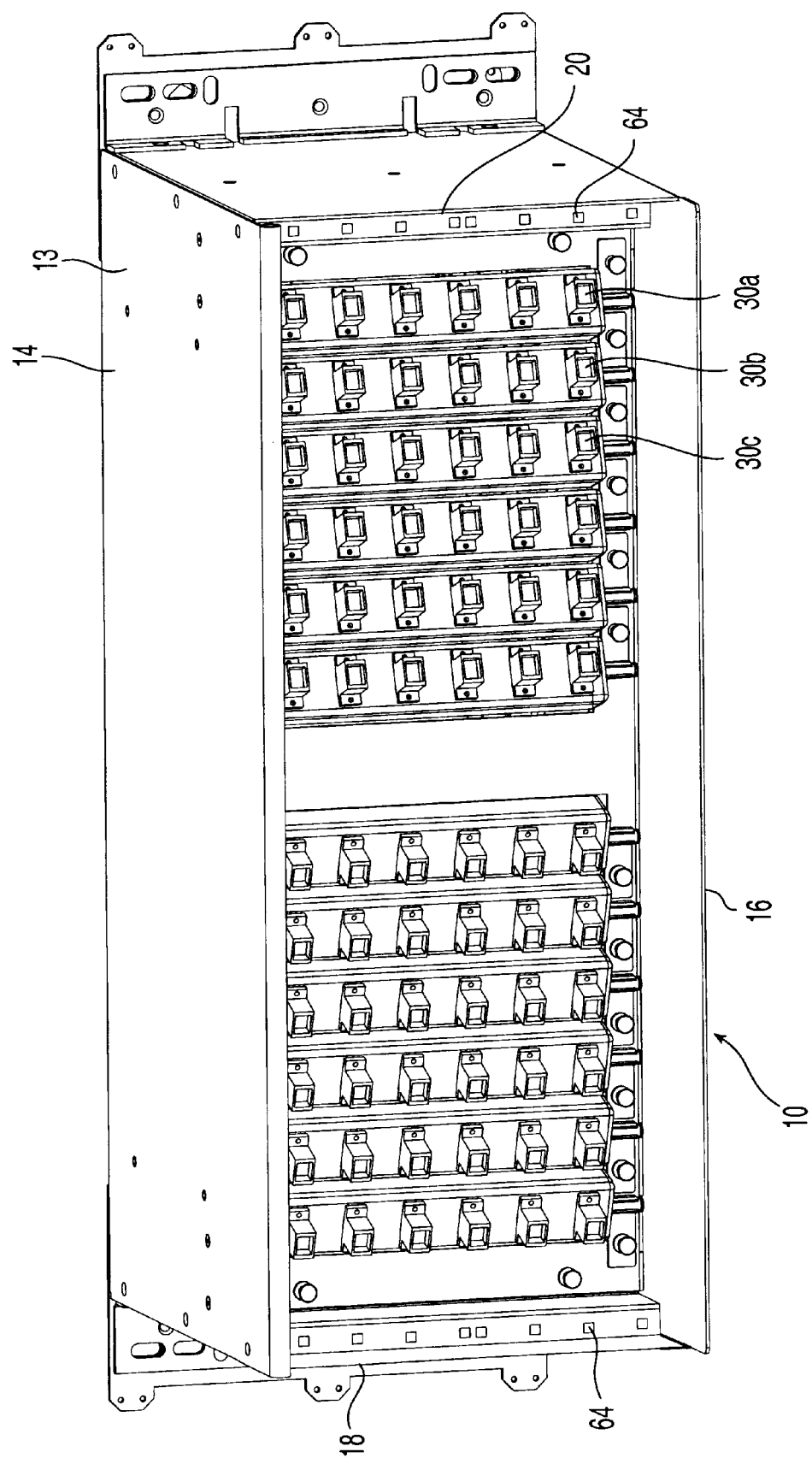
FIG. 2 is a perspective view of the cabinet of FIG. 1 with the adapters oriented at various angles with respect to the front of the cabinet.
Figure 3:
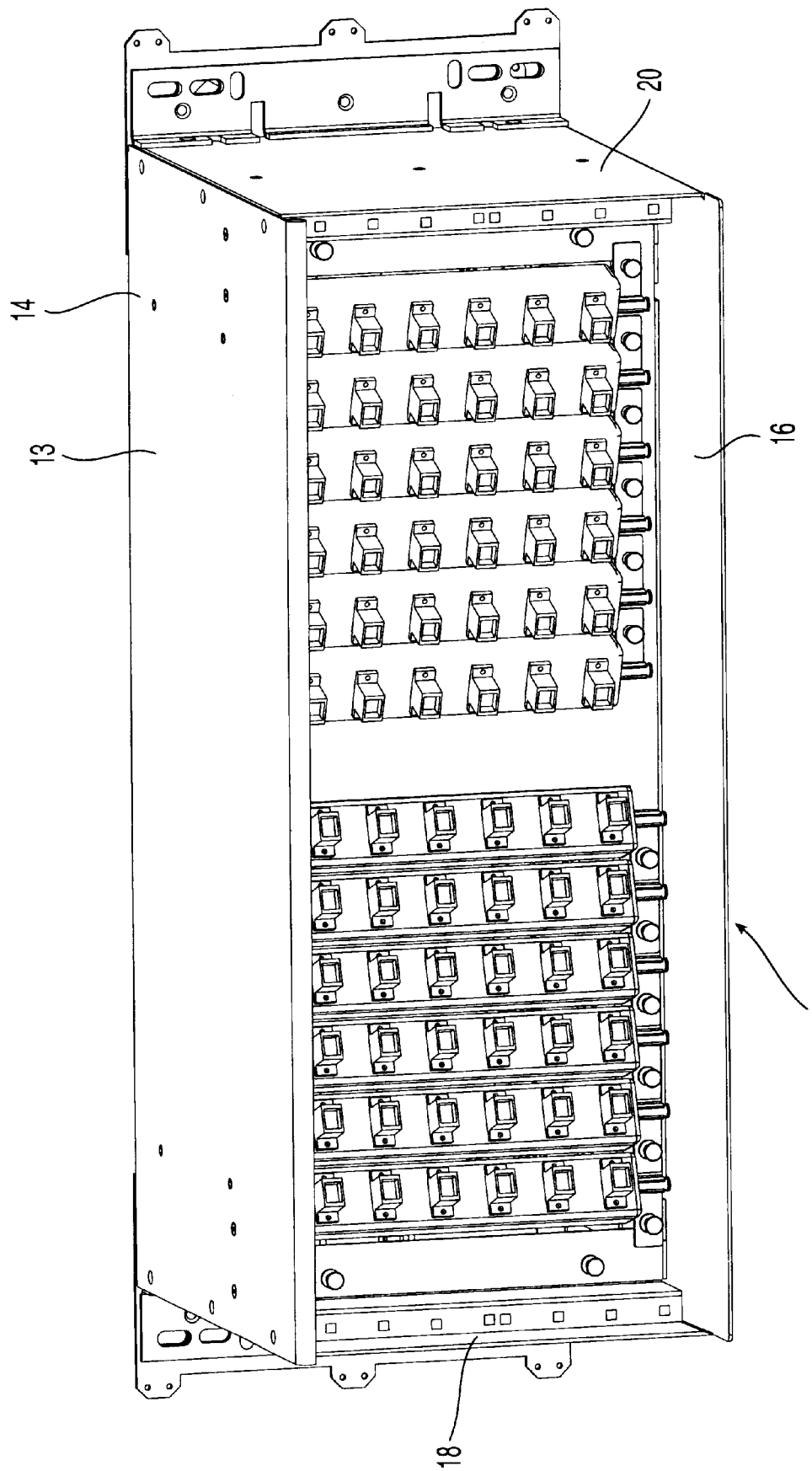
FIG. 3 is a perspective view of the cabinet of FIG. 1 with some of the adapters at 90 degrees to the front of the cabinet and some of the adapters oriented at various angles with respect to the front of the cabinet.

FIG. 1 shows the plurality of adapter panels 30 all in the detent position. FIG. 2 shows six adapter panels on the left rotated to orient the adapters at an angle to the left and six adapter panels on the right rotated to orient the adapters at an angle to the right. FIG. 3 shows six adapter panels on the left rotated to orient the adapters toward the middle of the cabinet and the six adapter panels on the right are in the detent position. The particular angle can be any angle and each individual adapter panel can be at a different angle than any other adapter panel. For example, in FIG. 2, the adapter panel 30a which is furthest to the right may be at 80 degrees with respect to the front plane of the cabinet, adapter panel 30b at 70 degrees, adapter panel 30c at 60 degrees and so on. This allows the adapter panels to be oriented to "aim" the adapters at the jumper management features on the side of cabinet 10 to provide the smoothest routing path of a jumper from the adapter to the management feature. Adapter panels 30 can be oriented and reoriented as desired at any time whether it be before installation, at installation and/or after installation. For example, cabinets 10 may be shipped with the adapter panels in the detent position as shown in FIG. 1, then the adapter panels can be rotated toward the closest side of the cabinet before jumpers are connected to the adapters as shown in FIG. 2, and then the adapter panels can be "fine-tune" rotated with the jumpers connected, while observing the jumpers to provide the smoothest routing path for the jumpers.

Figure 7A:
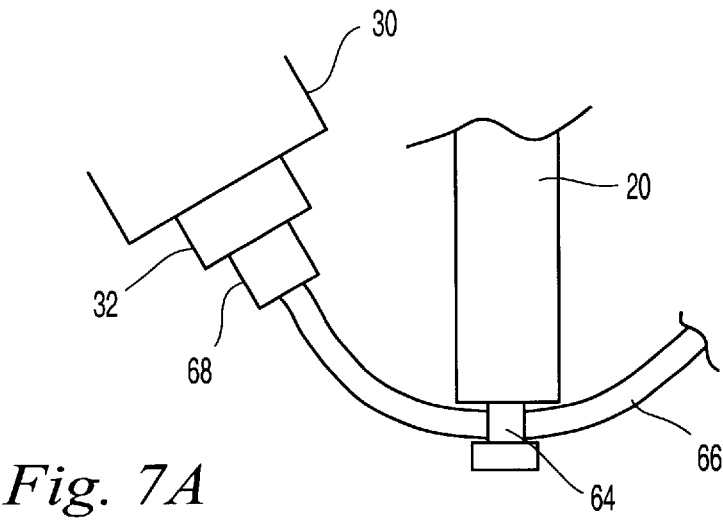
FIG. 7A is a top view illustrating a preferred orientation of an adapter panel for routing a jumper.
Figure 7B:
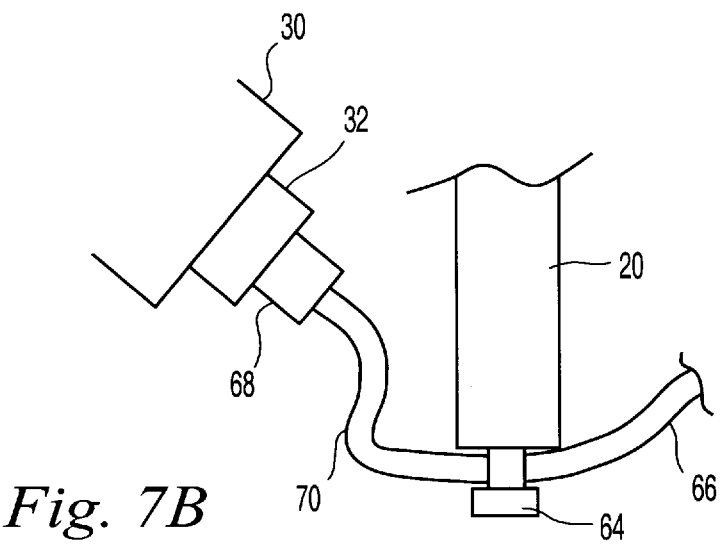
FIG. 7B is a top view illustrating a non-preferred orientation of an adapter panel resulting in a kink.
Figure 7C:
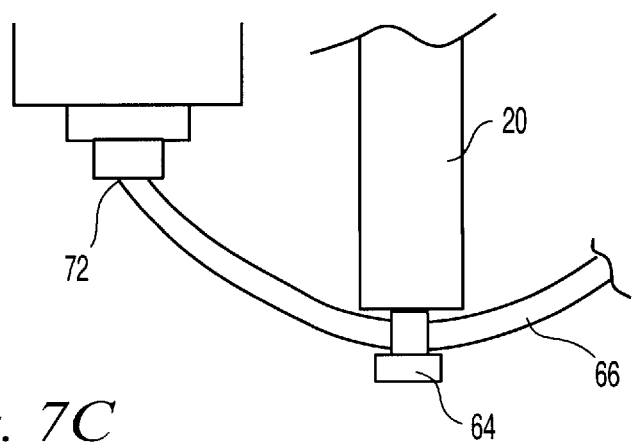
FIG. 7C is a top view illustrating a non-preferred orientation of an adapter panel resulting in an excessive bend.
Figure 8:
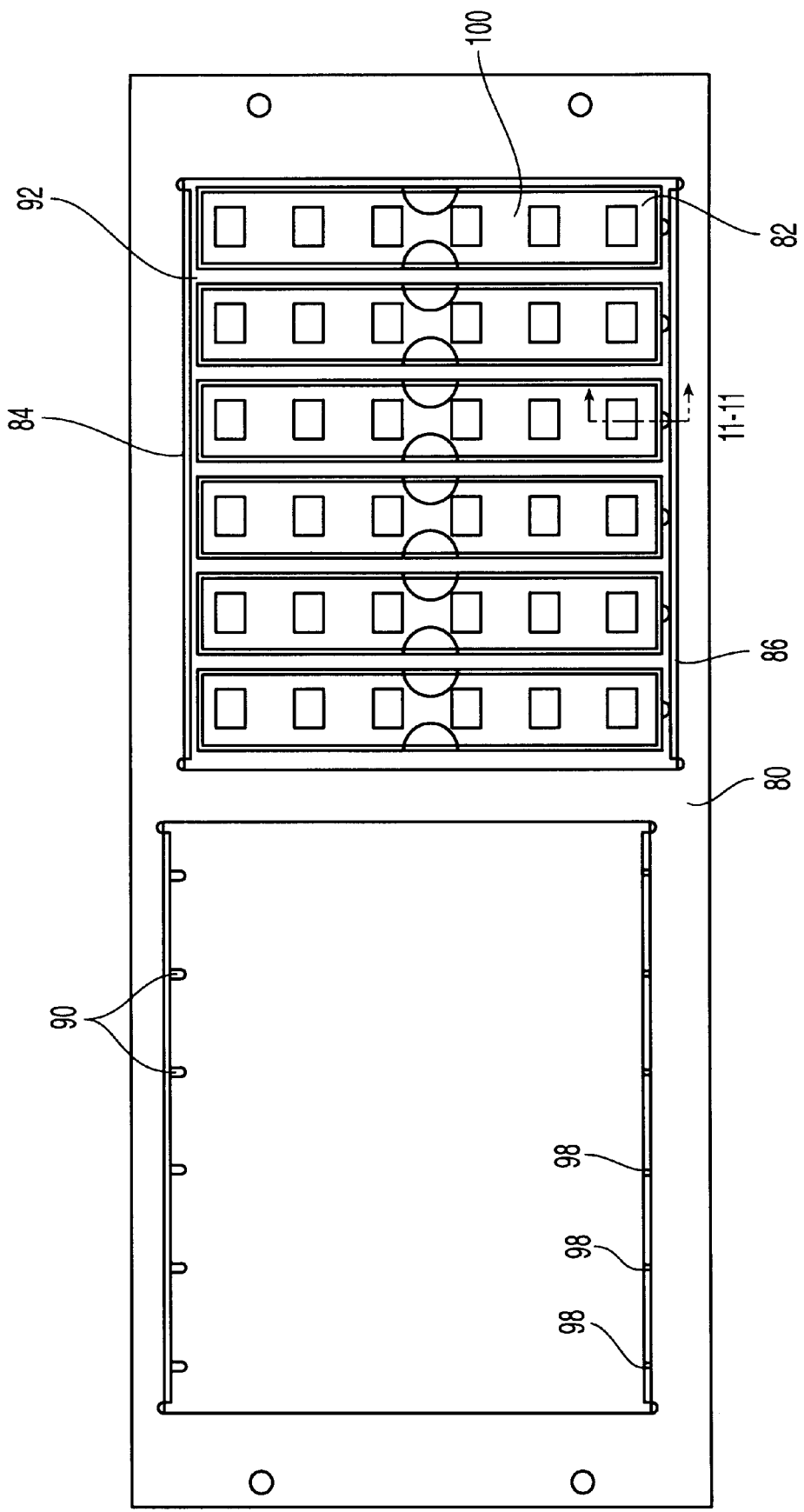
FIG. 8 is a front view of the preferred embodiment of a front wall of a connector cabinet of the present invention.
Figure 9:
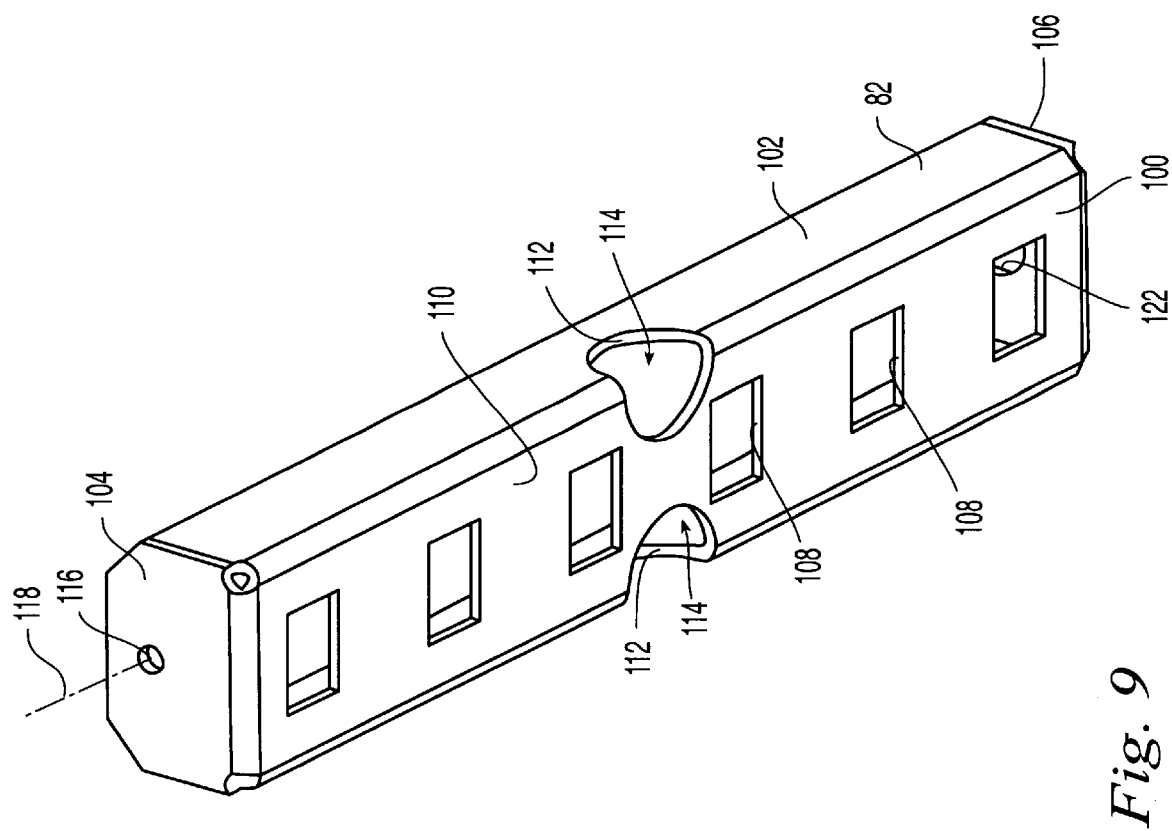
FIG. 9 is a perspective view of the preferred embodiment of the adapter panel used in the front wall of FIG. 8.

With reference to FIGS. 7A–C, fine tune rotation of adapter panel 30 is illustrated to avoid kinking or excessive bending. FIG. 7A shows adapter panel 30 rotated to a position where jumper 66 has a smooth routing path through management feature 64 when connector 68 is connected to adapter 32. FIG. 7B shows adapter panel rotated too far such that kink 70 results in jumper 66. To relieve the kink, adapter panel 30 is simply rotated in a clockwise direction until jumper 66 curves smoothly. FIG. 7B illustrates one potential drawback of cabinets where the adapters are held at predetermined angles. In the event that a new jumper with a connector that is longer than connector 68 is installed, adapter panel 30 can be fine tuned rotated to accommodate the longer connector and its effect on the routing of the jumper. FIG. 7C illustrates excessive bend 72 in jumper 66 that potentially could occur when the adapter panel is at 90 degrees to the front plane of the cabinet. To relieve this bend, the adapter panel is simply rotated in the counter clockwise direction until the jumper is routing through a smooth curve as in FIG. 7A.

The use of pieces 33 allows adapter panels 30 to be used on existing connector cabinet designs. The dimensions of adapter panels 30 and location of plungers 34 are simply modified to fit with an existing connector cabinet. Alternatively, a connector cabinet could have channels 52 defined in front wall 26 to receive the pivot studs of adapter panels 30 and thereby eliminate the need for pieces 33.

Figure 10:
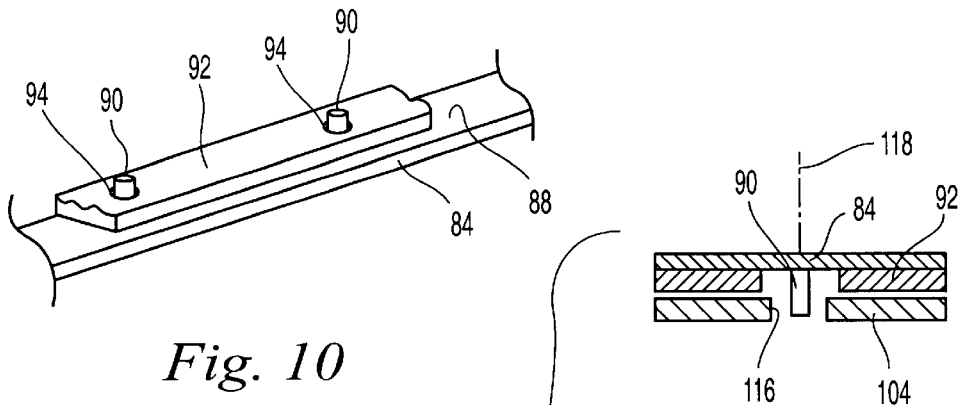
FIG. 10 is a partial perspective of the front wall of FIG. 8 detailing the gasket and top pivot points.

With reference to FIGS. 8–11, a presently preferred embodiment of front wall 80 and adapter panels 82 of a cabinet of the present invention is shown. Front wall 80 has top ledge 84 and bottom ledge 86 opposite thereto. Top ledge 84 has underside 88 with a series of studs 90 mounted thereto extending downward. With reference to FIG. 10 that shows a detail of underside 88, gasket strip 92 is affixed to underside 88 and defines openings 94 through which studs 90 extend. Bottom ledge 86 has top surface 96 and defines a series of holes 98 located such that each hole 98 is disposed vertically under a respective stud 90.

Adapter panel 82 has front 100, sides 102, top surface 104 and bottom surface 106. Front 100 defines cut-outs 108 to receive adapters therein. Front 100 and sides 102 define comers 110 that have openings 112 therein to provide finger grips 114. Top surface 104 defines hole 116 which is sized to receive stud 90 therethrough. The center of hole 116 coincides with pivot axis 118 of adapter panel 82.

Figure 11B:
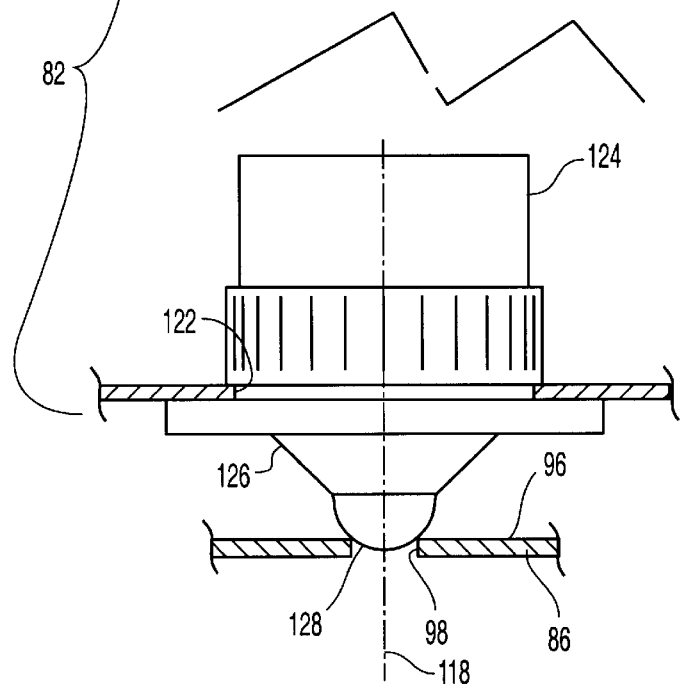
FIG. 11B is a partial cross section of the adapter panel of FIG. 9 installed in the front wall of FIG. 8 detailing the top and bottom pivot points.
Figure 11A:
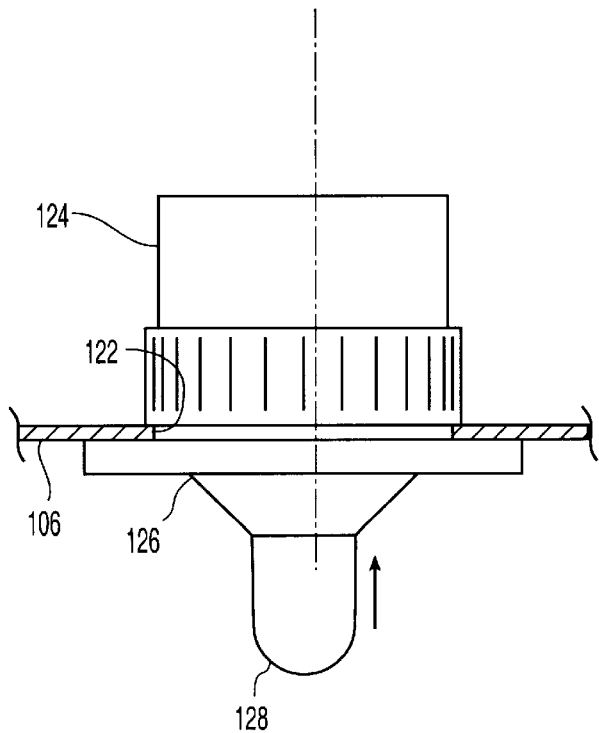
FIG. 11A is a partial cross section of the adapter panel of FIG. 9 detailing the bottom pivot point.

With reference to FIGS. 11A–B, bottom surface 106 of adapter panel 82 defines opening 122 through which is mounted spring plunger fastener 124. The preferred fastener 124 is available from PEM and has body 126 within which plunger 128 is spring mounted and biased to an extended position as shown in FIG. 11A and can be pressed to a retracted position as shown in FIG. 11B when adapter panel 82 is installed between bottom ledge 86 and top ledge 84. The bias force of plunger 128 biases top surface 104 against gasket strip 92 to induce friction against top surface 104 that helps retain adapter panel 82 at any angle to which it is rotated by hand.

For installation, hole 116 is first located over a stud 90 and then plunger 128 is pressed over bottom ledge 86 until plunger 128 snaps into hole 98. Once installed as such, adapter panel 82 is freely rotatable about axis 118 to orient the adapters at any angle. While this embodiment does not incorporate a detent, one could readily be added by, for example, having a projection on one of the ledges and a mating indentation on the adapter panel to provide a detent position for the adapter panel. Also, fastener 124 could be located on the top of the adapter panel or on either ledge of the front wall.

FIG. 12 shows an alternative embodiment of adapter panel 82' that has pull tab 132 that provides a gripping point to insert, remove or rotate adapter panel 82'.

FIG. 13 shows an alternative embodiment of mounting adapter 140 to be pivotable relative to the cabinet with gimbal assembly 141. Specifically, adapter 140 is snapped into first gimbal ring 142 which also doubles as an adapter panel 143 which has first pivot axis 144 defined by first pegs 146. Pegs 146 are snapped into second gimbal ring 148 which has second pivot axis 150 defined by second pegs 152. Pegs 152 are snapped into gimbal frame 154 that has flexible projections 156 that snap fit to a wall 158 through opening 160. Wall 158 can be like a known statically mounted adapter panel for mounting to the front wall or it may be the front wall itself which has an array of openings 160 to hold a plurality of gimbal assemblies 141. First and second pegs 146, 152 snap into respective notches 164 that are shaped to receive pegs snap fit therein and allow rotation of the pegs therein. First gimbal ring 142, or adapter panel 143, provides a horizontal axis of rotation and second gimbal ring 148 provides a vertical axis of rotation. Thus adapter 140 can be rotated about two axes to any angle relative the front face of a cabinet. As an alternative, one of the gimbal rings can be eliminated so that adapter 140 is only pivotable about one axis. The remaining gimbal ring would simply be adapted to receive the adapter and snap to the gimbal frame.

Although the present invention has been described with respect to certain embodiments, it should be understood that various changes, substitutions and modifications may be suggested to one skilled in the art and its is intended that the present invention encompass such changes, substitutions and modifications as fall within the scope of the appended claims.

We claim:

1. An optical fiber connector cabinet, comprising:
   (a) a housing defining a front plane that is generally vertical;
   (b) at least one adapter panel rotatably mounted on the housing and rotatable relative to the housing about an axis of rotation that is generally parallel with the front plane of the housing; and
   (c) at least one optical fiber connector adapter mounted to the at least one adapter panel such that the angular position of the at least one adapter relative to the front plane of the cabinet can be varied by rotation of the adapter panel.

2. The connector cabinet of claim 1 wherein the axis of rotation is substantially vertical.

3. The connector cabinet of claim 1 wherein the housing comprises a front wall that is parallel with the front plane of the housing and the at least one adapter panel is rotatably mounted to the front wall.

4. The connector cabinet of claim 3 wherein the adapter panel has a first stud extending from the adapter panel and a second stud extending opposite thereto that define an axis of rotation and the first and second stud are rotatably mounted to the front wall.

5. The connector cabinet of claim 4 wherein the adapter panel further comprises pieces that rotatably receive the first and second studs and the pieces have fasteners for being fastened to the front wall.

6. The connector cabinet of claim 1 further comprising a gimbal ring that rotatably receives the adapter panel and that is rotatably mounted to the housing such that the adapter is rotatable about two axes each generally parallel with the front plane of the housing.

7. The connector cabinet of claim 3 wherein the front wall has a first ledge extending in a generally horizontal plane and a second ledge spaced therefrom and extending generally parallel therewith, and wherein the adapter panel is rotatably mounted between the first and the second ledge.

8. The connector cabinet of claim 7 wherein the first ledge has a compressible gasket located thereon to contact a horizontal surface of the adapter panel and impart friction when the adapter panel is rotated relative to the housing about a vertical axis.

9. The connector cabinet of claim 8 wherein the horizontal surface of the adapter panel is spring biased against the gasket.

10. The connector cabinet of claim 9 wherein the adapter panel further comprises a plunger fastener having a base mounted to one end of the adapter panel and a plunger that is retracted against a spring force in the fastener to be biased against one of the ledges of the front wall in a direction that is parallel with the axis of rotation of the adapter panel.

11. The connector cabinet of claim 1 wherein the adapter panel has at least one detent position that can be overcome by rotation of the adapter panel.

* * * * *